(12) United States Patent
Toth et al.

(10) Patent No.: US 10,191,501 B2
(45) Date of Patent: Jan. 29, 2019

(54) SYSTEMS AND METHODS FOR POWER STEALING

(75) Inventors: Bartholomew L. Toth, Crestwood, MO (US); Xiaobing Zhu, Chesterfield, MO (US)

(73) Assignee: Emerson Electric Co., St. Louis, MO (US)

( * ) Notice: Subject to any disclaimer, the term of this patent is extended or adjusted under 35 U.S.C. 154(b) by 881 days.

(21) Appl. No.: 13/409,985

(22) Filed: Mar. 1, 2012

(65) Prior Publication Data
US 2013/0228633 A1   Sep. 5, 2013

(51) Int. Cl.
G05D 23/19   (2006.01)
H02J 7/02    (2016.01)
H02J 9/00    (2006.01)

(52) U.S. Cl.
CPC .......... *G05D 23/1905* (2013.01); *H02J 7/025* (2013.01); *H02J 9/005* (2013.01)

(58) Field of Classification Search
CPC .............. F24F 11/0009; F24F 2011/0068
USPC ............................... 236/1 C, 49.3, 51
See application file for complete search history.

(56) References Cited

U.S. PATENT DOCUMENTS

| | | | |
|---|---|---|---|
| 3,933,197 A * | 1/1976 | Zimmer | G05D 23/1912 165/216 |
| 4,174,807 A * | 11/1979 | Smith | G05D 23/1904 165/268 |
| 4,264,034 A * | 4/1981 | Hyltin | G05D 23/1904 236/46 R |
| 4,776,514 A | 10/1988 | Johnstone et al. | |
| 4,898,229 A * | 2/1990 | Brown | G05D 23/19 165/11.1 |
| 5,127,464 A | 7/1992 | Butler et al. | |
| 5,192,874 A | 3/1993 | Adams | |
| 5,304,781 A | 4/1994 | Stalsberg | |
| 5,635,896 A | 6/1997 | Tinsley et al. | |
| 5,736,795 A | 4/1998 | Zuehlke et al. | |
| 5,768,116 A | 6/1998 | Kompelien | |
| 5,903,139 A * | 5/1999 | Kompelien | H02M 5/293 307/39 |
| 6,288,458 B1 | 9/2001 | Berndt | |
| 6,315,211 B1 | 11/2001 | Sartain et al. | |
| 6,490,174 B1 | 12/2002 | Kompelien | |

(Continued)

OTHER PUBLICATIONS http://www.journalgazette.net/article/20100816/BIZ0101/308169954; 2 pgs.

(Continued)

*Primary Examiner* — Jianying Atkisson
*Assistant Examiner* — Meraj A Shaikh
(74) *Attorney, Agent, or Firm* — Harness, Dickey & Pierce, P.L.C.; Anthony G. Fussner

(57) ABSTRACT

A thermostat includes a power stealing circuit selectively configured to provide power to the thermostat and to circuit (s) ancillary to the thermostat from power source(s) external to the thermostat, without requiring a common or neutral connection between the thermostat and the power source(s). Exemplary embodiments also are disclosed of a climate control system that includes such a thermostat. This thermostat can power-steal off of existing load wires (e.g., a W and/or Y terminal, etc.) and can provide power for a continuous backlight and/or other device (e.g., a remote sensor and/or low-power transceiver, etc.).

20 Claims, 3 Drawing Sheets

(56) References Cited

U.S. PATENT DOCUMENTS

| | | | |
|---|---|---|---|
| 6,566,768 B2 * | 5/2003 | Zimmerman | H02J 7/00 307/125 |
| 6,657,418 B2 | 12/2003 | Atherton | |
| 6,741,158 B2 | 5/2004 | Engler et al. | |
| 7,476,988 B2 | 1/2009 | Mulhouse et al. | |
| 7,642,674 B2 | 1/2010 | Mulhouse et al. | |
| 7,755,220 B2 | 7/2010 | Sorg et al. | |
| 8,078,325 B2 | 12/2011 | Poth | |
| 8,110,945 B2 | 2/2012 | Simard et al. | |
| 8,314,517 B2 | 11/2012 | Simard et al. | |
| 8,493,098 B1 * | 7/2013 | Tousignant | H03K 5/24 327/78 |
| 9,983,244 B2 * | 5/2018 | Juntunen | G01R 27/16 |
| 2004/0113748 A1 * | 6/2004 | Carey | H01H 37/043 337/327 |
| 2005/0120012 A1 * | 6/2005 | Poth | G05B 15/02 |
| 2007/0228183 A1 * | 10/2007 | Kennedy | F24F 11/30 236/1 C |
| 2010/0084482 A1 | 4/2010 | Kennedy et al. | |
| 2012/0126019 A1 * | 5/2012 | Warren | G05D 23/1902 236/51 |
| 2012/0155137 A1 | 6/2012 | Simard et al. | |
| 2012/0179300 A1 | 7/2012 | Warren et al. | |
| 2012/0199660 A1 * | 8/2012 | Warren | G05D 23/1902 236/1 C |
| 2012/0248210 A1 | 10/2012 | Warren et al. | |
| 2012/0256009 A1 | 10/2012 | Mucignat et al. | |
| 2012/0261109 A1 | 10/2012 | Warren et al. | |
| 2012/0267089 A1 | 10/2012 | Mucignat et al. | |
| 2012/0325919 A1 | 12/2012 | Warren et al. | |

OTHER PUBLICATIONS http://wiki.cytexone.com/download/attachments/16777246/Reducing+Power+Stealing+Side+Effects.pdf; 4 pgs.

http://pexsupply.blogspot.com/2011/11/power-stealing-thermostats.html; 3 pgs.

Texas Instruments, TPS60210, TPS60211, TPS60212, TPS60213 Regulated 3.3V, Low-Ripple Charge Pump with Ultralow Operating Current; Jun. 2000; 22 pgs.

Chinese Office action issued in Chinese Patent of Invention Application No. 201210181875.7, which claims priority to the instant application, dated Aug. 21, 2014; 8 pgs.

Canadian Office action issued in Canadian Patent Application No. 2,805,268, which claims priority to the instant application, dated Aug. 1, 2014; 3 pgs.

\* cited by examiner

SYSTEMS AND METHODS FOR POWER STEALING

FIELD

The present disclosure relates to systems and methods for power stealing.

BACKGROUND

This section provides background information related to the present disclosure which is not necessarily prior art.

Digital thermostats typically have microcomputers and other components that continuously use electrical power. A digital thermostat may obtain power from an external power supply (e.g., a transformer, etc.) and/or from an internal power supply (e.g., a replaceable battery, etc.).

SUMMARY

This section provides a general summary of the disclosure, and is not a comprehensive disclosure of its full scope or all of its features.

Exemplary embodiments are disclosed of a thermostat that includes a power stealing circuit selectively configured to provide power to the thermostat and to one or more circuits ancillary to the thermostat from one or more power sources external to the thermostat, without requiring a common or neutral connection between the thermostat and the one or more power sources. Exemplary embodiments also are disclosed of a climate control system that includes such a thermostat and/or power stealing circuit.

Exemplary embodiments also are disclosed of a thermostat that includes a power stealing circuit selectively configured to provide power to the thermostat and to one or more circuits ancillary to the thermostat, without requiring a connection of the thermostat to a common or neutral connector of a power source external to the thermostat or to a power source internal to the thermostat. Exemplary embodiments also are disclosed of a climate control system that includes such a thermostat and/or power stealing circuit.

Exemplary implementations also are disclosed of a method of providing climate control. The method includes connecting a thermostat with a climate control system. The thermostat has a power stealing circuit selectively configured to provide power to the thermostat and to one or more climate control system circuits ancillary to the thermostat from a power source external to the thermostat. The climate control system is operated using the thermostat. The method is performed without having to connect the thermostat, through a common or neutral wire connection, with the external power source.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In various implementations of the present disclosure, a power stealing circuit of a thermostat can provide power to the thermostat and to one or more circuits ancillary to the thermostat, e.g., to a backlight and/or to a remote sensor, etc. The power may be provided from power source(s) external to the thermostat, without requiring a common or neutral connection (e.g., a "C" wire connection, etc.) between the thermostat and the external power source(s). A thermostat in accordance with aspects of the present disclosure can be used, e.g., where no "C" wire has been run from an external transformer to the thermostat. On the other hand, if a "C" wire is available at the thermostat, the thermostat may optionally be connected to provide power to the ancillary circuits through the "C" wire.

Figure 1:
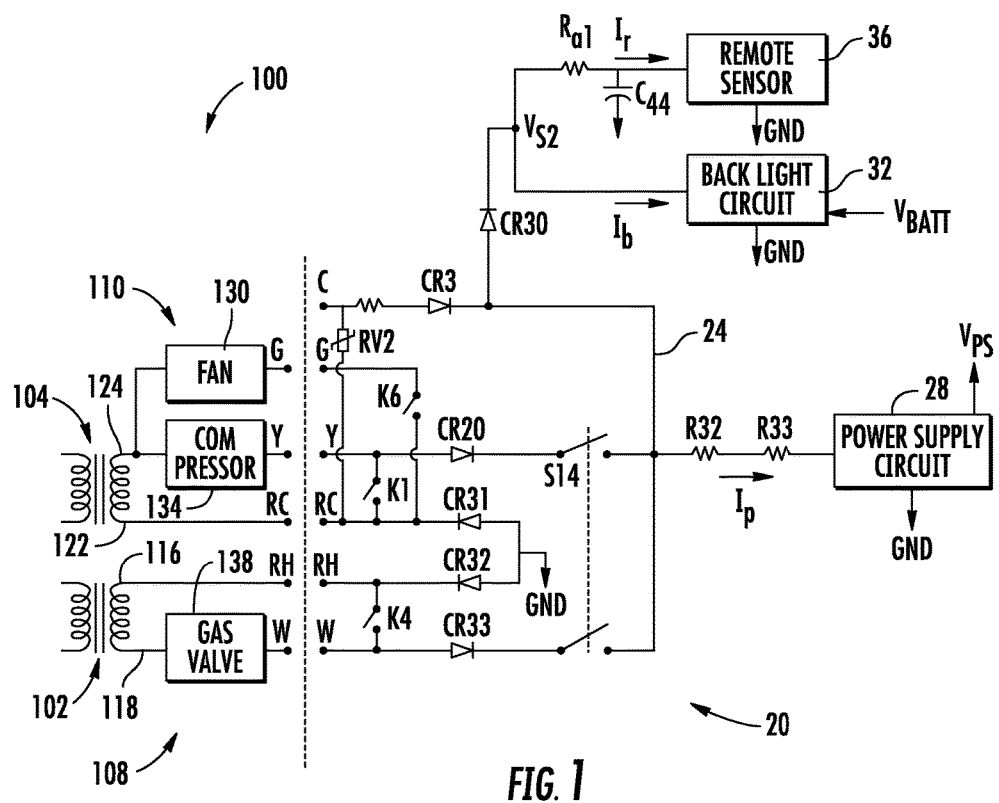
FIG. 1 is a simplified wiring diagram of an exemplary climate control system including a thermostat in accordance with an exemplary embodiment of the present disclosure.

One example embodiment of a digital thermostat is indicated generally in FIG. 1 by reference number 20. The thermostat 20 is used in a climate control system indicated generally by reference number 100. The climate control system 100 includes two power sources, e.g., two transformers 102 and 104 for providing power respectively to a heating subsystem 108 and a cooling subsystem 110. The heating subsystem transformer 102 has a hot (typically 24-volt) side 116 and a common or neutral side 118. The cooling subsystem transformer 104 has a hot (typically 24-volt) side 122 and a common or neutral side 124. The cooling subsystem 110 includes a fan 130 and a compressor 134 connected on the common or neutral side 124 of the transformer 104. The heating subsystem 108 includes a gas valve 138 connected on the common or neutral side 118 of the heating subsystem transformer 102.

The thermostat 20 includes a power stealing circuit 24 that provides power to a power supply circuit 28 of the thermostat 20. A voltage $V_{PS}$ from the power stealing circuit 24 is available at the power supply circuit 28. The power supply circuit 28 provides substantially continuous power to components (not shown) such as a processor and a thermostat control circuit. The power stealing circuit 24 also provides power to one or more circuits ancillary to the thermostat, e.g., to a backlight circuit 32 and a remote temperature sensor 36. The power stealing circuit 24 obtains power from the heating subsystem 108 and/or cooling subsystem 110 through a selector switch S14. The switch S14 connects both the gas valve 138 and the compressor 134 with the power supply circuit 28. The switch S14 is normally closed and may include, for example, a DIP switch, a jumper, a zero-ohm resistor, etc. that may optionally be opened in some situations as further described below. It should be noted that other or additional circuits ancillary to the thermostat 20 could be provided in place of or in addition to the backlight circuit 32 and sensor 36 and could provide power in accordance with various implementations of the present disclosure. For example, a transceiver and/or other or additional types of sensors could be provided ancillary to the thermostat 20. Further, unless otherwise clearly indicated herein, the term "ancillary to the thermostat," as referred to in the present disclosure and claims, may be construed (without limitation) as including "ancillary to a circuit of the thermostat."

The thermostat 20 is connected with the heating and cooling subsystems 108 and 110 at corresponding terminals G, Y, RC, RH and W. Specifically, the fan 130 is connected with the thermostat 20 at the G terminals, the compressor 134 is connected with the thermostat 20 at the Y terminals, and the gas valve 138 is connected with the thermostat 20 at the W terminals. Although the thermostat 20 includes a C terminal as shown in FIG. 1, no use is made of it in the embodiment shown in FIG. 1.

The thermostat 20 may turn on the heating subsystem 108 by closing a switch K4 to short a circuit through the heating subsystem transformer 102 and the gas valve 138. The thermostat 20 may turn on the compressor 134 by closing a switch K1 to short a circuit through the cooling subsystem transformer 104 and compressor 134. Additionally or alternatively, the thermostat 20 may turn on the fan 130 by closing a switch K6 to short a circuit through the cooling subsystem transformer 104 and fan 130. The thermostat 20 may turn off the cooling subsystem 110 by opening the switches K1 and K6, and may turn off the heating subsystem 108 by opening the switch K4.

During time periods when the heating subsystem transformer 102 is powering a load of the heating subsystem 108, the power stealing circuit 24 steals power from the common or neutral side 124 of the cooling subsystem transformer 104 and provides it to the power supply circuit 28 through the compressor 134 and switch S14. A circuit is completed through signal ground and a diode CR31. Additionally, the power stealing circuit 24 provides power from the "hot" side 122 of the cooling subsystem transformer 104 to the remote sensor 36 and backlight circuits 32, e.g., through a varistor RV2 and diodes CR3 and CR30. During time periods when the cooling subsystem transformer 104 is powering a load of the cooling subsystem 110, the power stealing circuit 24 steals power from the common or neutral side 118 of the heating subsystem transformer 102 and provides it to the power supply circuit 28 through a diode CR33 and the switch S14. A circuit is completed through signal ground and a diode CR32. Additionally, the power stealing circuit 24 provides power from the common or neutral side 118 of the heating subsystem transformer 102 to the remote sensor 36 and backlight circuits 32 through the switch S14 and the diode CR30.

Example component and current values are as follows:
CR20, CR31, CR32, CR33, CR3, CR30—S1G
RV2—40 VAC
R32, R33—1.6 KΩ
$R_{a1}$—4.7 KΩ
C44—10 micro-farad, 50 volt
$I_p$—320 microamps (approximate)
$I_b$—7.6 milliamps (approximate)
$I_r$—262 microamps (approximate)

Figure 2:
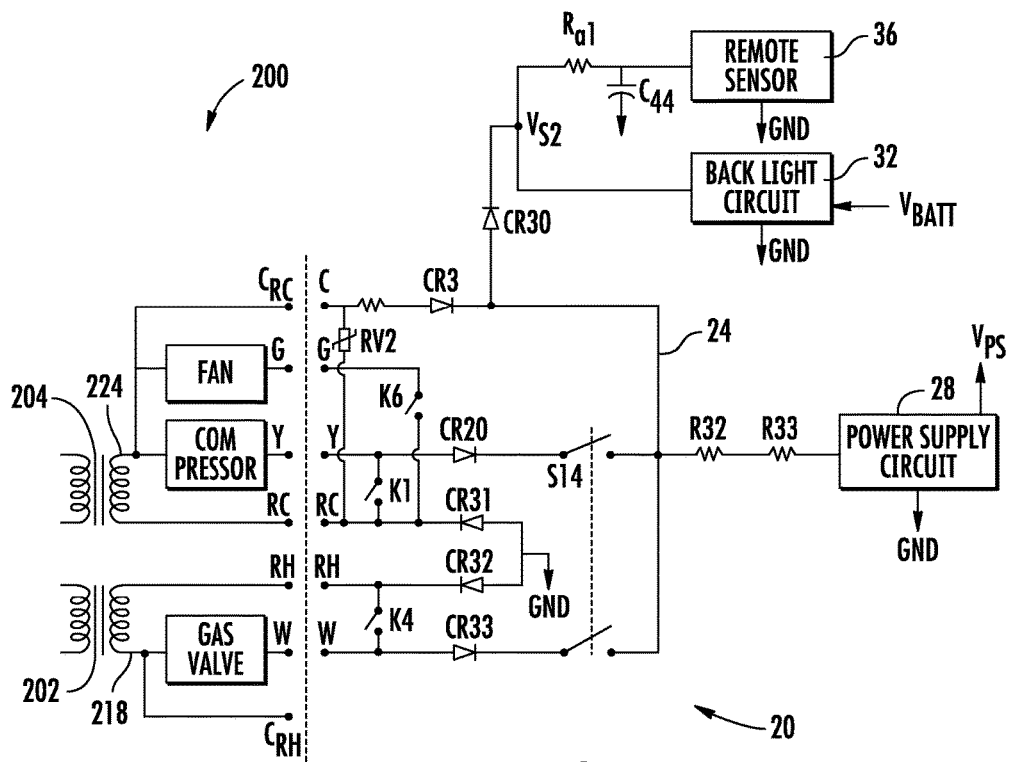
FIG. 2 is a simplified wiring diagram of an exemplary climate control system including a thermostat in accordance with an exemplary embodiment of the present disclosure.

The thermostat 20 is operable to control the climate control system 100 without requiring a connection to a common or neutral connector (e.g., a "C" wire, etc.) from the transformers 102 or 104. In various embodiments, however, a common or neutral wire may be available to the thermostat 20 from a climate control system power source external to the thermostat 20. For example, as shown in FIG. 2, the thermostat 20 is used in a climate control system 200.

A wire $C_{RC}$ connected at the C terminal of the thermostat 20 extends from the common or neutral side 224 of a cooling subsystem transformer 204. Additionally or alternatively, a wire $C_{RH}$ may be provided, as shown in FIG. 2, from the common or neural side 218 of a heating subsystem transformer 202. In the configuration shown in FIG. 2, the power stealing circuit 24 may provide power to the power supply circuit 28 as previously discussed with reference to FIG. 1, and power may be provided to sensor 36 and backlight circuits 32 through the wire $C_{RC}$ and diodes CR3 and CR30.

In various embodiments the thermostat 20 may include an internal auxiliary power supply (e.g., a replaceable battery, etc.) for use by the thermostat 20 in the event that external power is lost. If external power is lost, then the battery may provide power to at least the backlight circuit 32. In such event a backlight may be activated, e.g., by a user activating a switch, e.g., by touching a touch screen (not shown) of the thermostat 20. When AC power is available and power stealing is possible, the backlight and remote sensor 36 may be continuously powered. In some configurations, a processor of a thermostat is capable of detecting whether or not AC power is available. If AC power is not available, the processor activates the backlight for a short period, e.g., 10 seconds, when a user activates a switch by touching the thermostat screen. If AC power is available, the processor ignores user input with respect to operation of the backlight.

Figure 3:
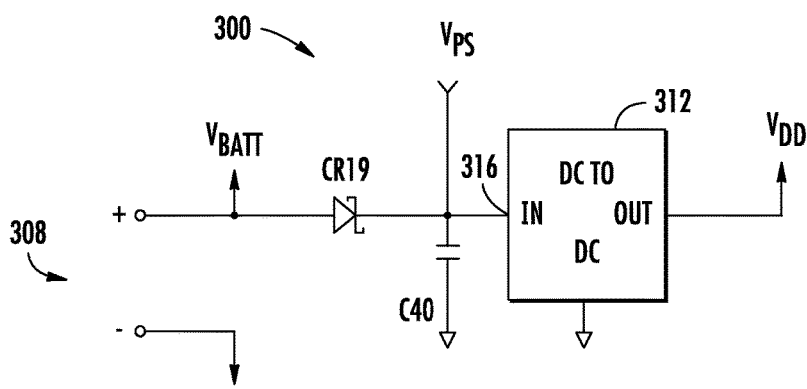
FIG. 3 is a simplified wiring diagram of an exemplary battery power circuit of a thermostat in accordance with an exemplary embodiment of the present disclosure.

One configuration of a battery power circuit is indicated generally in FIG. 3 by reference number 300. A battery 308 is connected through a Schottky diode CR19 to a DC-DC boost charge pump 312. One example charge pump is a TPS60212 available from Texas Instruments Incorporated, Dallas Tex. Voltage $V_{PS}$ from the power stealing circuit 24 is available between the Schottky diode CR19 and input 316 of the charge pump 312. The charge pump 312 outputs a voltage $V_{DD}$ that is used to power control circuitry (not shown) of the thermostat 20. When, e.g., there is no AC power and the input voltage $V_{PS}$ is no longer available, the battery 308 provides power to the thermostat 20 through the charge pump 312.

Figure 4:
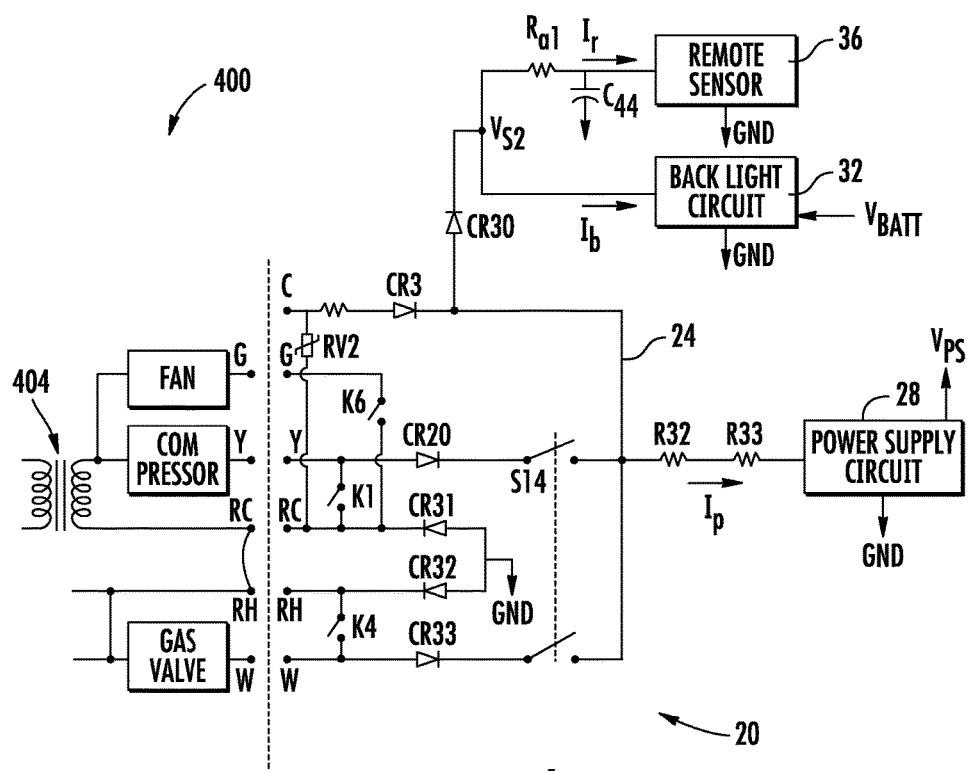
FIG. 4 is a simplified wiring diagram of an exemplary battery power circuit of a thermostat in accordance with an exemplary embodiment of the present disclosure.

In some configurations, the thermostat 20 may be provided for use in a climate control system that provides only heat or only cooling using a single transformer, or both heating and cooling using a single transformer. In such a system, a single transformer typically provides power to the load, and a battery provides power to the thermostat 20, while the load is energized. One example climate control system that uses a single transformer is indicated generally in FIG. 4 by reference number 400. Both heating and cooling are provided using a transformer 404 for which terminals RC and RH are jumpered together. When the load is de-energized, power is provided to the thermostat 20 through the switch S14.

The switch S14 may be used to open the power stealing circuit 24 in the unlikely event of unintended operation of, e.g., the climate control system 100 (shown in FIG. 1). Such an event, although rare, might occur if a sufficient amount of leakage current were to be pulled through the power stealing circuit 24 to cause enough voltage to be generated at the thermostat 20 to turn on the climate control system 100 independent of a command signal from the thermostat 20.

In some configurations of the foregoing thermostat 20 and power stealing circuit 24, a switch enables power from a 24-volt transformer to be used by the thermostat circuitry when either a heating or cooling circuit is not energized. When the cooling circuit is energized, the circuit power-steals from the heating circuit. When the heating circuit is energized, the circuit power-steals from the cooling circuit.

In exemplary embodiments, the above-described power stealing circuit may provide a significant improvement over existing power stealing circuits that require a thermostat to have a "C" wire available from a 24 volt transformer to power a remote sensor and backlight. In some thermostats currently in use, even if a power stealing switch were closed, neither the power stealing circuit n or the battery would be able to power a backlight or the remote sensor. Notably, the inventors hereof have recognized that it is not common at the present time to have a "C" wire available in the wiring that normally connects a typical thermostat to HVAC equipment. It may be available in new construction, if required by the selected HVAC system. However in an existing installation, a HVAC contractor would have to pull a new wire to provide a "C" connection to a thermostat, if required.

Therefore, a thermostat is highly useful that has the ability to power-steal off of the existing load wires (e.g., the W and/or Y terminal, etc.) without the need to provide any new connections, and in addition to provide power for a continuous backlight and/or other device (e.g., a remote sensor and/or low power transceiver, etc.) and as such extend the life of the thermostat battery to essentially the shelf life of the battery.

Exemplary embodiments of a power stealing circuit as described in the present disclosure enable a thermostat to power a backlight and/or other circuit (e.g., a remote sensor, etc.) off of a "C" terminal, if available, or off of the power stealing circuit, by closing the switch S14, or off of the battery if power is lost. This circuit enables a thermostat to continuously power a backlight without relying on a C terminal, which (as the inventors have observed) in most situations will not be available in a wiring harness. In addition, if power is lost, the backlight operation will be retained by the battery, when the S14 switch is closed, until the power is restored. Some exemplary embodiments include a thermostat with provisions for remote temperature sensor with or without "C" terminal utilizing power stealing circuitry that switches automatically between power stealing or non-power stealing applications.

It should be noted that although various embodiments of the disclosure are described with reference to thermostats, other or additional configurations are possible in relation to devices, controllers, controls, and control systems other than thermostats. Power stealing could be implemented, e.g., in relation to a device that has access to two or more load circuits, such that at a given time one of the circuits would not be carrying a load and would be available from which to steal power in accordance with aspects of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermostat comprising:
a power stealing circuit selectively configured to provide power to the thermostat and to one or more circuits ancillary to the thermostat from one or more power sources external to the thermostat, without requiring a common or neutral connection between the thermostat and the one or more external power sources;
the power stealing circuit operable to connect a power supply circuit of the thermostat with heating and cooling subsystems of a climate control system, the heating and cooling subsystems external to the thermostat;
the power stealing circuit having a selector switch configured in the power stealing circuit to selectively enable and/or disable power stealing such that, when power stealing is enabled, the selector switch connects a heating circuit of the external heating subsystem of the climate control system and a cooling circuit of the external cooling subsystem of the climate control system together and connects both the heating and cooling circuits with the power supply circuit of the thermostat, in order to provide power through at least one of the heating circuit and cooling circuit to the power supply circuit;
the power stealing circuit configured to provide power from the one or more external power sources to the power supply circuit through the selector switch and through at least one of the heating circuit and cooling circuit without having to provide power to the power supply circuit from any power source internal to the thermostat.

2. The thermostat of claim 1, wherein the one or more ancillary circuits comprise one or more of the following: a back light, a sensor, and a transceiver.

3. The thermostat of claim 1, further comprising a battery configured to provide alternative power to the one or more ancillary circuits.

4. The thermostat of claim 1, further comprising a common or neutral connection with the one or more power sources.

5. The thermostat of claim 4, wherein the thermostat is selectively configured to provide power to the one or more ancillary circuits through the common or neutral connection.

6. The thermostat of claim 1, wherein the power stealing circuit is selectively configured to provide power to the thermostat and to the one or more circuits ancillary to the thermostat from a single power source external to the thermostat.

7. The thermostat of claim 6, further comprising a battery configured to provide power to the thermostat and to the one or more circuits ancillary to the thermostat when a load of the single power source external to the thermostat is energized.

8. The thermostat of claim 1, wherein the selector switch is operable to disconnect the power stealing circuit from the one or more external power sources.

9. A climate control system comprising the thermostat and/or power stealing circuit of claim 1.

10. A thermostat comprising:
a power stealing circuit selectively configured to provide power to a power supply circuit of the thermostat and to one or more circuits ancillary to the thermostat from one or more power sources external to the thermostat, without requiring a connection of the thermostat to a common or neutral connector of a power source external to the thermostat and without having to provide power to the power supply circuit of the thermostat from a power source, if any, internal to the thermostat;
the power stealing circuit having a selector switch configured in the power stealing circuit to selectively enable and/or disable power stealing performable in a climate control system through both a heating circuit and a cooling circuit, where the heating and cooling circuits are external to the thermostat, connected together by the selector switch and are both connected with the power supply circuit of the thermostat when power stealing is enabled, in order to provide power through at least one of the heating circuit and cooling circuit to the power supply circuit;
the power stealing circuit configured to provide power from the one or more external power sources to the power supply circuit through the selector switch and through at least one of the heating circuit and cooling circuit, wherein the power stealing circuit is configured to:
provide power from the one or more external power sources to the power supply circuit through the selector switch and through the heating circuit, but not through the cooling circuit, when one of the one or more external power sources is powering a load of the cooling circuit; and
provide power from the one or more external power sources to the power supply circuit through the selector switch and through the cooling circuit, but not through the heating circuit, when one of the one or more external power sources is powering a load of the heating circuit.

11. The thermostat of claim 10, wherein the one or more ancillary circuits comprise one or more of the following: a back light, a sensor, and a transceiver.

12. The thermostat of claim 10, further comprising a battery configured to provide alternative power to the one or more ancillary circuits.

13. The thermostat of claim 10, further comprising a connection with a common or neutral connector of the one or more power sources.

14. The thermostat of claim 13, wherein the thermostat is selectively configured to provide power to the one or more ancillary circuits through the common or neutral wire connection.

15. The thermostat of claim 10, wherein the selector switch is operable to disconnect the power stealing circuit from the one or more external power sources.

16. A climate control system comprising the power stealing circuit and/or thermostat of claim 10.

17. A method of providing climate control, the method comprising:

connecting a thermostat with a climate control system, the thermostat having a power stealing circuit selectively configured to provide power to the thermostat and to one or more climate control system circuits ancillary to the thermostat from a power source external to the thermostat, the power stealing circuit configured to selectively connect a power supply circuit of the thermostat with heating and cooling subsystems of the climate control system, the heating and cooling subsystems external to the thermostat, the power stealing circuit having a selector switch configured in the power stealing circuit to selectively enable and/or disable power stealing, the selector switch connecting the heating circuit and the cooling circuit together and connecting both the heating and cooling circuits with the power supply circuit of the thermostat when power stealing is enabled, the power stealing circuit configured to provide power, from the power source external to the thermostat but not from any power source internal to the thermostat, to the power supply circuit through the selector switch and through at least one of the heating circuit and cooling circuit; and operating the climate control system using the thermostat;

the method performed without having to connect the thermostat, through a common or neutral wire connection, with the external power source.

18. The method of claim 17, wherein:

the climate control system includes a common or neutral wire connection available to the thermostat from the power source external to the thermostat;

the method further comprises connecting the thermostat to the common or neutral wire connection; and the one or more climate control system circuits ancillary to the thermostat are powered through the common or neutral wire connection.

19. The thermostat of claim 12, wherein the power stealing circuit is selectively configured to provide the power from only one power source external to the thermostat, and the battery is configured to provide the alternative power when a load of the only one power source external to the thermostat is energized.

20. The thermostat of claim 15, further comprising a battery configured to provide power to the thermostat and/or one or more circuits ancillary to the thermostat when the power stealing circuit is disconnected by the selector switch from the one or more external power sources.

* * * * *